Patented Nov. 3, 1931

1,830,486

UNITED STATES PATENT OFFICE

SAMUEL S. SADTLER, OF SPRINGFIELD TOWNSHIP, MONTGOMERY COUNTY, PENNSYLVANIA, ASSIGNOR TO AMIESITE ASPHALT COMPANY OF AMERICA, OF CAMDEN, NEW JERSEY, A CORPORATION OF NEW JERSEY

METHOD OF BUILDING ROADS AND IN PREPARING OF THE MATERIALS THEREFOR

No Drawing.     Application filed July 2, 1929.    Serial No. 375,591.

My invention relates to methods of building roads and more particularly to the building of those roads or pavements wherein bituminous materials, such as asphalts and the like, are employed as the binders for mineral aggregate.

I have discovered that sulphur, in small quantities, changes such bituminous materials as the asphalts and asphaltic cements, and enhances certain properties therein which are useful in the making of pavements, roads, streets, driveways and the like, particularly if the sulphur be added to the bituminous material while the latter is in a melted condition.

I wish to clearly distinguish my discovery and the application of it to the arts from those heretofore known treatments of oils and bitumens, with heat and sulphur for the purpose of vulcanizing the same. Generally speaking such vulcanizing processes, when carried to their limit, have for their object the conversion of asphalt or other bituminous substances into a product which is solid, rigid, and very different from the original material from which the vulcanized product was made, similar to the way in which the vulcanization of rubber changes the elastic green rubber into hard rigid vulcanized rubber.

My process, insofar as I understand it, practically involves the dissolving of sulphur in bituminous materials, such as the asphalts, without depriving them of their bituminous characteristics, but merely changing, increasing or decreasing certain bituminous properties thereof, as for example, making them more or less penetrating, more fluent when melted and somewhat less penetrating and tougher when cold, thus enabling one to modify and enhance those properties which are desirable in bituminous materials for use as a binder for bituminous pavements.

That there is no true vulcanizing action in the practice of my process, would appear to be evident from the fact that the vulcanization of oils and bitumens is effected at a temperature of substantially 482° F. and during such treatment substantial quantities of hydrogen sulphide and probably other sulphur compounds are liberated, while in the practice of my invention, the temperature of the bituminous materials is not raised to that at which vulcanization is effected, but temperatures distinctly lower than that are employed (350° F. to 300° F. or even lower) and during the practice of my process only traces of sulphur compounds are liberated from the mixture.

Nor am I unaware that residual oil asphalts usually contain about 5% by weight of sulphur, but these oil asphalts have been previously heated to very high temperatures during the process of distilling of the volatile oils therefrom, and such sulphur as there may be in these oil asphalts has already entered into combination therewith and has effected all the vulcanization thereof which it is possible to effect at any temperature which the asphalt will stand without decomposition.

In the practice of my improved process, the sulphur that I add appears to remain in the asphalts in a dissolved state, that state being either merely in solution or in some combination with the asphalt, short of that which occurs as the result of any so-called vulcanizing processes.

One of the objects of my invention is to enable one to use asphalts of higher penetration as determined by the Dow method (softer), than one would otherwise be able to use in the making of asphaltic or bituminous pavements. Although the sulphur does not seem to have an immediate substantial effect upon the penetration of the asphalt, it gradually increases it, when added to hot asphalt, making a mixture of asphalt and aggregate easier to mix, shovel, rake and otherwise handle, but after the pavement has been placed, compacted and allowed to stand the bituminous material is slightly tougher, harder and its penetration is substantially decreased.

To illustrate what is meant by the above, I will state that in the making of cold laid asphalt oil pavements of graded stone without "fines" in such a manner as to produce voids in the finished pavement, if an oil asphalt of substantially less penetration than from 85 to 100 were to be used, the finished pavement would be likely to be hard and frangible in winter and if an oil asphalt of higher penetration were to be used the finished pavement would probably be too soft in warm weather. But when I use oil asphalt of from 120 to 140 penetration and add thereto a small quantity of sulphur, in accordance with my present discovery and invention, I find that paving material, which is to be laid cold, is much easier to mix with the aggregate in the pug mill, is easier to handle after the coating operation is completed, and prior to placement, and that after placement and compaction on the roadway it gradually becomes firm (its penetration decreases and it becomes tough). Within a short time after placement the asphalt appears to be equal in stability to a pavement made with 100 penetration oil asphalt without the use of sulphur.

I find that a small quantity of sulphur added to asphalt or other bituminous material used in making pavements of widely different characters, is beneficial in that a better adherence of the asphalt to the aggregate results, whether the aggregate be sand or broken stone or gravel and that the aggregate itself after having been so coated with the bituminous material, treated with sulphur, is also more resistant to water. These properties are highly desirable in the making of hot mix, hot placed pavements, using an aggregate of sand or even finer materials mixed therewith or an aggregate of stone, as in the making of a Topeka pavement or an asphalt concrete. It is also of value in making asphalt pavements of graded stone without "fines" and laid cold, as will be referred to again below.

In making hot laid asphalt pavements, (sheet asphalt pavements), the aggregate is usually finely divided mineral matter, such as graded sand or "fines". The aggregate, heated to substantally from 300° F. to 350° F. is placed hot in a pug mill or other mixing apparatus, or it is heated and kept hot in said mixer, and while it is being agitated asphaltic cement heated to the same or a higher temperature is added thereto and thoroughly mixed therewith. This asphaltic cement is usually an asphalt of relatively low penetration, thoroughly mixed with a flux, such as an asphaltic or other non-volatile oil, which permanently increases the fluidity or penetration of the asphalt to the extent desired. In carrying out my improvement in the process of making such hot mix pavements, I add to the hot material in the mixer and preferably shortly prior to the end of the mixing operation, from substantially 1% to 5% and substantially less than 5% of powdered sulphur, calculated upon the weight of the asphalt used in making the pavement.

After the mixing operation has been completed, the coated aggregate is promptly loaded into trucks and carried to the place of placement as soon as possible, for it is placed hot on the roadway and tamped or rolled or otherwise compressed while hot.

In making such hot mixed and hot laid asphalt pavement, in accordance with my invention, I find that I may use a substantially softer asphaltic composition or asphaltic cement than when such pavements are laid in the ordinary manner, that is to say, in the ordinary commercial practice of laying hot mix hot laid pavements the asphalts or cements or other bituminous materials so employed are usually of from 40 to 60 penetration. I find that I may readily use asphaltic compositions of from 60 to 80 penetration for the small quantity of sulphur added thereto gradually and finally reduces the penetration of the asphalt sufficiently to give in time the desired stability to the finished pavement and also enables one to carry on the process in the preparing of the materials at lower temperatures, both in the mixing and laying, and at the same time produce the proper degree of compaction.

The amount of bituminous material used in the preparation of my hot mixed hot laid pavements will vary considerably, depending upon the size of the aggregate, but in general, I may state that the amount of bituminous material consists of from 9% to 12% of the weight of the total mixture of bituminous material and aggregate. Thus for a ton of pavement mixture, the amount of bituminous cement will vary from 180 to 240 pounds.

In making paving mixtures to be laid cold, an asphaltic cement of from 60 to 140 penetration, a suitable quantity, as for instance, 1,900 pounds of dry graded stone at atmospheric temperatures, is weighed and placed in a pug mill or other suitable mixer and the aggregate is kept under agitation thereafter until the processes are completed.

If the cement be of high penetration, (e. g. 120–140), the addition thereto of a liquefier may be unnecessary, but if the heavier asphalts are used, I next add to the aggregate, which is being agitated, a suitable liquefier, such as kerosene, naphtha, drip oil or other coal tar, or other suitable solvent of bitumens, the quantity being sufficient to make all the surfaces of the stone glisten. From one gallon to one and one-half gallons of such liquefier will usually suffice for the purpose. After the aggregate has thus been wet or dampened with the liquefier, I add the powdered sulphur, from substantially 1% to 3% of the weight of the asphalt cement to be used in coating the aggregate. For 1885 pounds of aggregate, I sometimes use 115 pounds of asphaltic cement, or substantially 6% of the weight of the mixture of aggregate and cement, and the amount of powdered sulphur used would be, therefore, from a pound to a little more than three pounds by weight.

As soon as the aggregate is fully coated with the asphaltic cement containing the sulphur, small quantities of moderately fine mineral material are added, but the quantity should be relatively small so as not to fill the voids between the relatively larger pieces of aggregate. For such purposes I use hydrated lime or silex, stone dust, or stone fines, separately or mixed together. If stone "fines" only are used, (from 200 mesh to 16 mesh), the quantity may be substantially increased. For a ton of mixture, the weight of these fine materials will generally run from 5 to 10 pounds, (from ¼ of 1% to ½ of 1% of the weight of the mix), but if coarser or larger fines are added, (e. g. those passing through a 16 mesh screen), as much as 150 pounds (7½% of the weight of the mix) may be used. The addition of fine mineral materials is, among other things, for the purpose of forming a thicker coat of asphalt on the particles of aggregate than would be otherwise obtainable by slightly spacing the larger pieces of aggregate from each other. They may be added together with the sulphur.

The above specific quantities and proportions are given merely by way of example, for in making different kinds of pavements by the use of my invention, the proportion of asphalt to the aggregate may vary considerably and that necessarily results in a considerable variation in the amount of sulphur used. Generally speaking, the amount of sulphur added to the asphaltic or bituminous material is that which will readily dissolve in the asphalt or other bituminous material at the temperature of the asphalt at the time when the sulphur is added thereto.

Having thus described my invention, what I claim and desire to protect by Letters Patent of the United States is:

1. The method of making a bituminous paving material, which consists in adding to a mineral aggregate, under agitation, a hot bituminous binding material and when the coating of said aggregate with said bituminous material is nearly completed, adding thereto a relatively small quantity of powdered sulphur, the quantity of sulphur being preferably substantially less than 5% of the weight of said bituminous material, the temperature of the mixture being below that at which the sulphur so added will substantially vulcanize the bituminous binding material.

2. The method of making a bituminous paving material, which consists in adding to a graded mineral aggregate, under agitation, a hot bituminous binding material, and when the coating of the aggregate of said binding material is nearly completed, adding thereto a relatively small quantity of powdered sulphur and finely divided mineral matter, the quantity of sulphur being preferably substantially less than 5% of the weight of said bituminous material, and the quantity of said finely divided mineral matter being from ¼ of 1% to 7½% of the weight of said mixture, the temperature of the mixture being below that at which the sulphur so added will vulcanize the bituminous material.

3. The method of making a bituminous paving material, which consists in adding to a graded mineral aggregate, under agitation, a bituminous binding material, heated to a temperature of not substantially over 300° F. and when the coating of the said aggregate with said binding material is nearly completed, adding thereto powdered sulphur, the quantity of sulphur being preferably substantially less than 5% of the weight of said bituminous material.

4. The method of making a bituminous paving material, which consists in adding to a graded mineral aggregate, under agitation, an asphaltic cement having a penetration index of from 60 to 80 and heated to a temperature of substantially 300° F. and adding thereto, before the coating of the aggregate with said bituminous material is completed, powdered sulphur, the quantity being from 1% to 3% of the weight of said bituminous material.

5. The method of making a bituminous paving material, which consists in adding to a graded mineral aggregate, under agitation, an asphaltic cement having a penetration index of from 60 to 80 and heated to a temperature of substantially 300° F. and when the coating of the aggregate with said cement is nearly completed, adding thereto powdered sulphur and finely divided mineral matter, the quantity of sulphur being from 1% to 3% of the weight of said bituminous material and the quantity of finely divided mineral matter being from ¼ of 1% to 7½% of the weight of said mixture.

In witness whereof, I have hereunto set my hand this first day of July, 1929.

SAMUEL S. SADTLER.